June 19, 1951 — T. F. ESERKALN ET AL — 2,557,866
MICROMETER DIAL
Filed Oct. 14, 1948 — 2 Sheets-Sheet 1
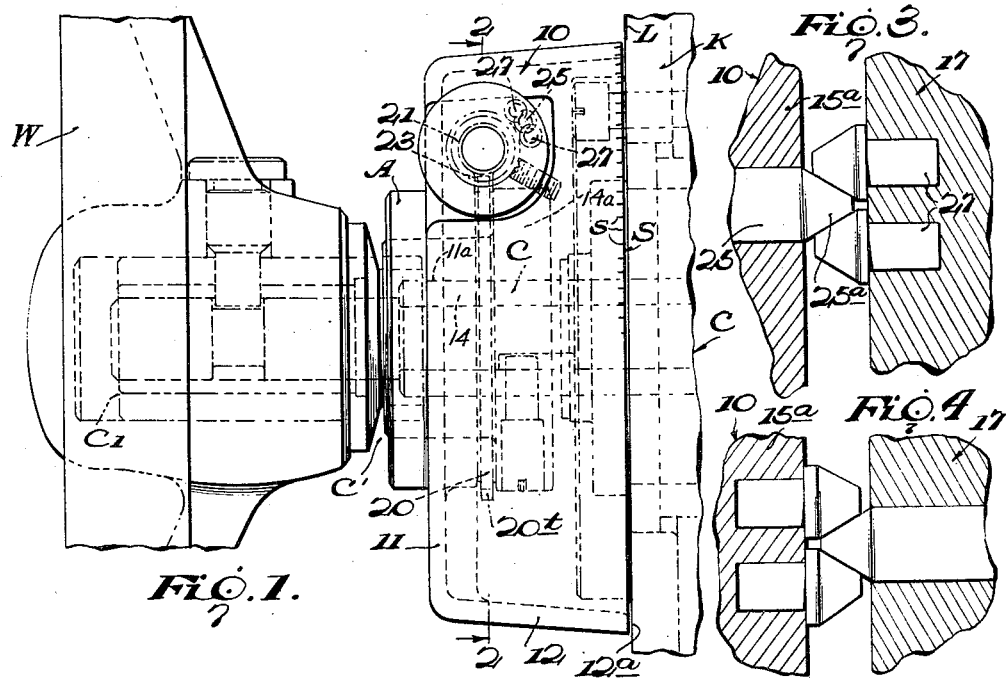
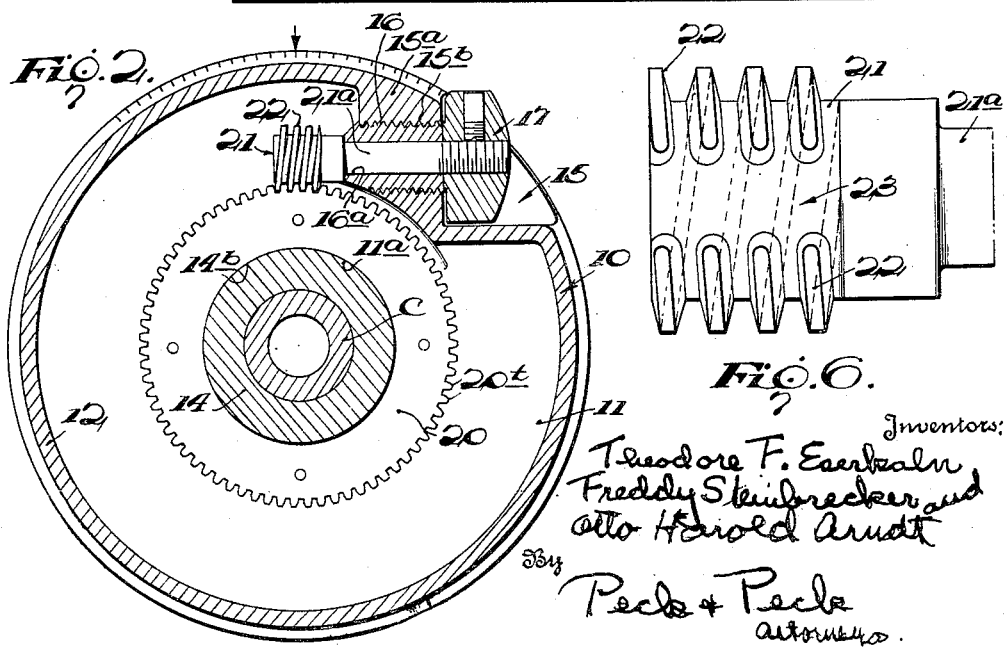
Inventors:
Theodore F. Eserkaln
Freddy Steinbrecker and
Otto Harold Arndt
By Peck & Peck
attorneys.

June 19, 1951     T. F. ESERKALN ET AL     2,557,866
MICROMETER DIAL
Filed Oct. 14, 1948                          2 Sheets-Sheet 2
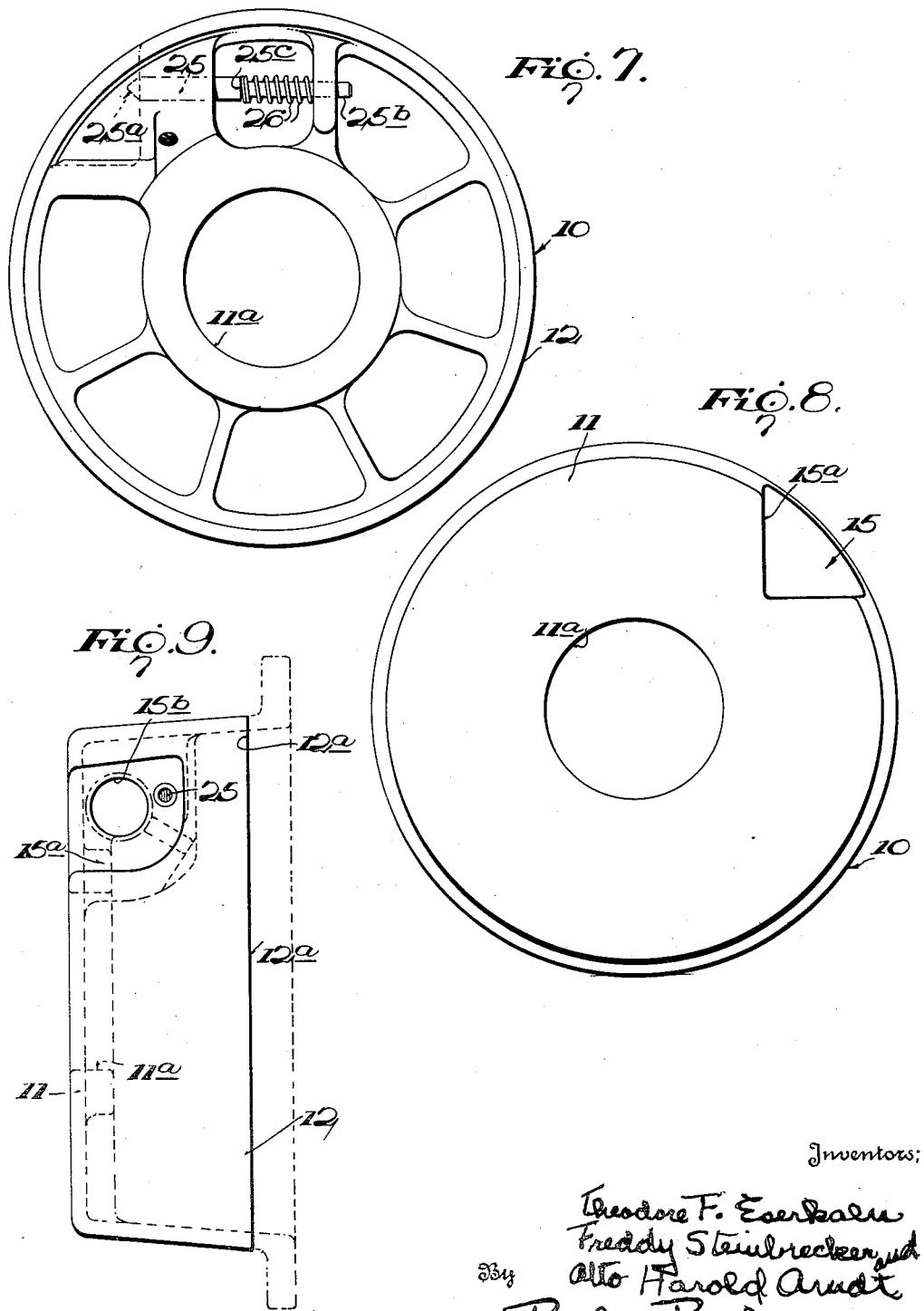

Patented June 19, 1951

2,557,866

UNITED STATES PATENT OFFICE 2,557,866

MICROMETER DIAL

Theodore F. Eserkaln, Freddy Steinbrecker, and Otto Harold Arndt, Wauwatosa, Wis., assignors to George Gorton Machine Co., Racine, Wis., a corporation of Wisconsin Application October 14, 1948, Serial No. 54,552

7 Claims. (Cl. 116—133)

This invention relates to certain improvements in micrometer dials, and particularly such dials as used on milling and the like machine tools; and the nature and objects of the invention will be readily recognized and understood by those skilled in the arts involved in the light of the following explanation and detailed description of the accompanying drawings illustrating by way of example several forms and adaptations of the invention from among various other adaptations, embodiments, forms, arrangements and combinations, of which the invention is capable within the broad spirit and scope thereof.

So-called micrometer dials are widely used on various types of machine tools, such for example as milling and the like machines, which include slides or movable elements actuated by rotary shaft members, such as feed screws, for accurately feeding the slides to relatively move with precision a work piece or other member and a cutting tool or other element. Such micrometer dials as generally used, take the form of a usually circular dial member or disc which is adjustably mounted on and concentric with the rotary feed screw or other rotary element for rotation therewith. The micrometer dial is provided with a micrometer scale in visible position thereon and therearound, the scale usually providing divisions each corresponding to one thousandth of an inch (.001″) of straight line or linear movement of the slide member which is to be actuated and fed by the feed screw. The dial is usually mounted in position on the feed screw or rotary member, the degree of rotation of which is to be measured on the dial scale in terms of resultant linear distance of feed of the slide member, in position adjacent relatively fixed structure bearing a reading point or index line immediately adjacent the scale around the dial, so that, the operator may read the scale against the index line. Generally such a micrometer dial is mounted for independent rotation on the feed screw or rotary element to adjust the micrometer dial scale relative to the position of the feed screw and the slide member fed thereby; means being provided for releasably securing the micrometer dial in an adjusted position on the feed screw for rotation with the screw.

The use of such micrometer dials on various types of machine tools and particularly those tools in which the slide members are power fed by power rotation of the feed screws, has long presented certain problems and difficulties which the present generally used forms of micrometer dials have not overcome; and it is a general object of our invention to provide an improved type of such micrometer dial and of the adjustable mounting therefor on a rotary member such as a rotary feed screw, by which certain of the problems and difficulties as heretofore encountered will be eliminated or their effect minimized.

It is highly desirable from the standpoint of visibility that the micrometer dial have as large a diameter as possible in order to render the scale which is provided thereon and therearound of a size to be readily visible to the operator. With machine tools having power feeds, it is the general practice to utilize solid jaw clutches to engage the feed, so that, a feed screw placed in driving engagement by such a clutch is started from a standstill position to full rotation instantaneously. Hence, due to the high inertia forces which will be developed when the feed screw is driven by the engagement of such types of clutch, it has not been possible generally to utilize micrometer dials of large diameter mounted for infinite adjustment on a feed screw through the full range of adjustment and to also practically releasably secure and maintain such a large diameter dial in accurately adjusted positions for rotation with the feed screw and against displacement from adjusted position. These operating conditions have resulted in the use generally of comparatively small diameter dials mounted for infinite adjustment together with various relatively inefficient and inaccurate releasable dial securing means, such as a wrench released and engaged, cup point set screw for releasably securing the dial in an adjusted position. While such generally utilized expedients have preserved for such small diameter dials, the desired infinite adjustment through the adjustment range, the small diameter of the dial necessitates the use of a correspondingly small size scale, so that, operator reading time as well as the inherent reading error potential are increased.

Those forms and types of comparatively large diameter dials which have gone into use and of which we are aware, have in order to obtain the gain in scale size and increased scale visibility resulting from the large diameter dial, been forced to sacrifice infinite adjustability for the dial due to the utilization of a releasable means for securing the dial in an adjusted position against the high inertia forces encountered, of such a character as to provide a series of definite, positive locked positions of adjustment throughout the range of adjustment of the dial on the feed screw. And such types of securing means require that the number of adjustment positions in which the dial may be releasably locked throughout the range of adjustment, must be equal to the number of divisions provided by the scale on the dial, so that, the dial cannot be infinitely adjusted through the adjustment range, and further, it is impossible to orient the index mark with a scale division of the dial should the index mark fall or be positioned mid-way between two (2) dial scale divisions on the original set up of such an arrangement.

It is a further object of our invention to provide a micrometer dial and adjustable mounting thereof on a rotary element by which the dial may be of any desired diameter and be infinitely adjusted on and relative to a rotary element through a range of three hundred sixty degrees (360°) for positive rotation in any adjusted position with the element, and further may be positively releasably locked in any adjusted position against displacement under the action of any inertia forces to which the dial may be subjected.

Another object is to provide a micrometer dial with an irreversible adjusting mechanism between the dial and the rotary member on which the dial is mounted, arranged in such a manner that the dial may be rotated to infinite positions of adjustment on and relative to the rotary member and may be locked in any adjusted position by the irreversible characteristics of the adjusting mechanism.

Another object is to provide such a combination of rotary member micrometer dial and irreversible adjusting mechanism for the dial, in which the irreversible mechanism is expressed as a worm and worm wheel forming the operative connection between the dial and the rotary member.

Another object is to provide a micrometer dial and infinitely adjustable self-locking micrometer dial adjusting mechanism therefor in which a manually operable adjusting mechanism actuating element is mounted on and carried by the dial in engagement with an element on the rotary member on which the dial is mounted, with the dial carried element and the rotary member mounted element being relatively movable to disengaged positions to release the dial member for free rotation on and independently of the rotary member, and to re-engaged positions for selective rotation of the dial to precise positions of adjustment relative to the rotary member.

A further object is to provide such a micrometer dial and infinitely adjustable mechanism therefor in which the manually engaged operating member for selectively actuating the adjusting mechanism is mounted on and carried by the dial.

And a further object is to provide such a micrometer dial and an infinitely adjustable and self-locking mechanism therefor in which a worm is rotatably mounted on the dial in engagement with a worm wheel on the rotary member on which the dial is mounted, with a manual operating knob mounted in accessible position on the dial for selectively rotating the worm to adjust the dial relative to the rotary member on which it is mounted.

Another object is to provide an arrangement of such a micrometer dial and adjusting mechanism having a dial carried worm and a rotary member mounted worm wheel in which the worm is so mounted on the dial as to be selectively movable to positions engaged with the worm wheel or disengaged therefrom to permit of free rotation of the dial on and relative to the rotary member on which it is mounted.

Another object is to provide such a micrometer dial and adjusting mechanism therefor of the worm and worm wheel form in which the worm wheel or cam is provided with a clearance slot disposed longitudinally of the worm through the threads thereof for positioning by rotation of the worm to receive the rotary member carried worm wheel to thus disengage the worm threads from the worm wheel and permit of rotating the dial on and independently of the rotary member and of the worm wheel mounted thereon; and a feature of the invention in connection with this worm wheel clearance slot form thereof resides in the formation of the threads of the worm or cam to have a pitch equal to the circular pitch of the worm wheel but a lead which is in excess of such pitch.

Another object is to provide a simple and efficient detent or stop means for releasably holding the worm in its disengaged position with the worm wheel received in the clearance slot of the worm, so that, the operator may readily align the worm clearance slot with the worm wheel, while the degree of rotation of the worm wheel will also be limited by the stop means so the operator cannot accidentally adjust the worm with only a part of the thread thereof engaged with the worm wheel.

With the foregoing and certain other objects, features and results in view which will be readily apparent from the following detailed description and explanation, our invention consists in certain novel features in design and construction of parts, elements, and organizations and in the various combinations, and sub-combinations thereof, as will be more fully referred to and explained hereinafter.

Referring to the accompanying drawings in which similar reference characters refer to corresponding parts or elements throughout the several figures thereof:

Fig. 1 is a view in side elevation of one form of micrometer dial of our invention mounted on the cross feed screw of a milling machine, the outer end portion only of the feed screw being shown together with a portion of a hand wheel for manual rotation of the feed screw.

Fig. 2 is a vertical section through the micrometer dial and irreversible worm and worm wheel adjusting mechanism of Fig. 1, taken as on the line 2—2 of Fig. 1.

Fig. 3 is a fragmentary detailed view partly in section of one arrangement of detent and stop pins for the micrometer dial of Fig. 1.

Fig. 4 is a fragmentary, detailed view partly in section of a modified arrangement of detent and stop pins.

Fig. 5 is a schematic view showing the development of the cam or worm of the irreversible adjusting mechanism of the micrometer dial arrangement of Fig. 1.

Fig. 6 is a view in side elevation of the worm or dial cam of the irreversible micrometer dial adjusting mechanism of Fig. 1, showing the clearance slot through the cam threads for alignment with and receiving the feed screw mounted worm wheel of the mechanism.

Fig. 7 is a detailed view showing the mounting of the detent pin on the micrometer dial of the arrangement of Fig. 1, the detent pin being shown in side elevation and a portion only of the dial being shown in cross section.

Fig. 8 is a front elevation of the micrometer dial arrangement of Fig. 1, with the feed screw operating hand wheel removed.

Fig. 9 is a side elevation of the dial, the feed screw operating hand wheel having been removed.

We have selected and disclosed and described herein, several possible forms and arrangements of micrometer dials and infinitely adjustable, irreversible or self-locking adjusting mechanisms therefor which are primarily designed for and shown as applied to a cross feed screw for the saddle slide element of a knee, saddle and table assembly of a milling machine. However, micrometer dials and adjusting mechanisms therefor embodying the principles of and incorporating the various features of our invention, are in no sense limited or restricted to any particular feed screw of a milling machine or other machine tool, or to mounting on and in combination with feed screws, as the invention may be expressed and implemented in various forms and designs of micrometer dials adapted for precise measurements resulting from or of rotation of, any form of rotary shaft or other rotary element. Hence, it is not intended by the illustrated examples to limit or restrict the application and use of micrometer dials of our invention to the feed screws, such as the cross feed screw of the illustrated examples.

In Figs. 1 to 8 inclusive of the accompanying drawings, we have illustrated what we now consider to be a preferred production design, construction and arrangement of micrometer dial and infinitely adjustable, irreversible adjusting mechanism therefor of the invention, for use on a feed screw or other rotary shaft element for feeding a so-called slide member, such as a saddle of a milling machine, knee, saddle and work table assembly.

Referring to Fig. 1, a portion of the front or forward vertical wall K of the knee of a knee, saddle and table assembly (not shown) for a milling machine is illustrated with the forward end C of a knee mounted cross feed screw extending forwardly and outwardly from the forward wall K of the knee. In this instance, the feed screw C may be considered to be of any of the power driven types usual in this art.

The particular form of feed screw C of this example, is provided with an axial bore extending thereinto through the forward end of the feed screw, and a spindle or rod indicated at C' in Fig. 1 is slidably mounted in such bore for limited movements axially of and relative to the feed screw. The rod C' projects outwardly a distance beyond the outer end of the feed screw C and mounts thereon a hand wheel W for manually rotating the feed screw when the power feed for the screw is disengaged. Hand wheel W is mounted for rotation on and independently of spindle C', and a suitable clutch means A is mounted on the outer end of feed screw C spaced a distance outwardly from the knee front wall K for movement axially of the feed screw with the spindle C' from and to position in clutching engagement with the clutch means A. With hand wheel W moved inwardly into clutching engagement with clutch means A, feed screw C may be manually rotated by the wheel with the hand wheel W moved outwardly to position disengaged with clutch means A, the feed screw C may be power rotated independently of and without causing positive rotation therewith of the hand wheel W.

A micrometer dial member or body 10 of generally circular form is mounted on the outer end of feed screw C between the clutch means A and the forward side of the vertical front wall K of the machine knee in position concentric with feed screw C. The dial member 10, in this instance, is formed of a cup-like body providing the circular base or outer wall 11 having the annular flange or skirt 12 therearound extending laterally from one side thereof and being outwardly flared or inclined from the base wall 10 to the outer free circular edge 12a therearound.

The base or front wall 11 of dial member 10 is formed and provided with a central, axial opening therethrough which provides a circular mounting and bearing surface 11a therearound concentric with the axis of the dial member. A sleeve member 14 is mounted on and over the outer end portion of feed screw C and is provided at and around the inner end thereof with a flange 14a extending therearound and radially therefrom. The exterior surface 14b of sleeve 14 between the inner side of flange 14a and the outer end of the sleeve is precisely machined to form a bearing surface 14b concentric with the axis of the feed screw C. The dial member 10 is rotatably mounted on the sleeve 14 at the outer side of sleeve flange 14a with the circular bearing surface 11a of the axial opening through base 11 of the dial member being rotatably received on the bearing surface 14b of sleeve 14, so that dial member 10 is thus rotatable on and independently of feed screw C about the axis of that screw as a center for adjusting the position of the dial member relative to the feed screw.

In this instance, a spiral gear or worm wheel, in the form of a ring gear 20 having spiral from teeth 20t around the outer periphery thereof is mounted on sleeve 14 secured to the forward side of flange 14a in position extending therearound concentric with the axis of feed screw C with the teeth 20t projecting radially outwardly beyond the peripheral surface of flange 14a. The dial member 10 is rotatably mounted on sleeve 14 in position rotatably engaged between the forward side of worm wheel 20, and in this instance, an inner surface provided at the inner side of the clutch means A. In such mounted position, the circular side wall formed by the skirt or flange 12 of the dial member, has a width to extend inwardly to the forward side of the knee front wall K, with the inner edge 12a of flange 12 terminating at but having operating clearance with knee front wall K, as will be clear by reference to Fig. 9.

The rearwardly and outwardly inclined, circular flange 12 of dial member 10 is provided with a micrometer scale S formed on and around the exterior surface thereof, this scale S in the present example being formed of division lines s extending forwardly from the inner edge 12a. The scale division lines s making up the scale S are calibrated to have a spacing between each pair of division lines corresponding to one thousandth of an inch (.001") of straight line or linear movement of the slide member, such as a saddle (not shown) actuated by rotation of the cross feed screw C. An index marker or line L is provided at a suitable location on the forward side of knee front wall K immediately adjacent the inner edge 12a of flange 12 for cooperation with rotary movement of scale S therepast as the dial member is rotated with the feed screw C. Such index line L is schematically shown in Fig. 1 in one possible position relative to scale S on dial member flange 12.

In accordance with our invention, we provide manually operable mechanism for selectively adjusting the dial member 10 to infinite positions of adjustment on and around and relative to feed screw C, and to the index line L on the relatively fixed structure adjacent to the dial member, such as represented in this example by the front wall K of the machine knee. And further, we provide such an infinitely adjustable mechanism as of the irreversible or self-locking type, so that, it is unnecessary for the operator to carry out any separate locking operations to secure the dial member in an adjusted position after such member has been rotated to the selected position of adjustment by the adjusting mechanism. Following a further feature of our invention, the adjusting mechanism is so designed and arranged as to permit of the dial member being released for free manual rotation in either direction on the feed screw or other rotary member on which it is mounted to thereby enable the operator to make initial coarse, approximate adjustments prior to precise adjustments by operation of the adjusting mechanism.

One form and arrangement of a micrometer dial and adjusting mechanism for carrying out the above and other features of our invention is illustrated in Figs. 1 to 9 inclusive, and basically embodies the use of a worm or cam member 21 mounted on and carried by dial member 10 for operative mesh with the worm wheel 20 fixed on the rotary speed screw C, so as to thus form an adjustable but irreversible operative connection between the dial member 10 and the feed screw C.

Referring to Figs. 1, 2 and 8, in particular, the circular side wall or flange 12 of dial member 10 is formed with a reentrant portion which provides a pocket or recess 15 therein opening through the flange 12 and through the front or base wall 11 of the dial member. A web or wall portion 15a of substantial thickness forms at its outer side an inner wall of pocket 15, and is provided with an internally screw threaded bore 15b therethrough having its axis tangential to the worm wheel 20. An externally threaded bushing 16 is threaded into and extends through bore 15b, the bushing 16 being formed with an axial bore 16a therethrough. The worm or cam 21 is formed with a reduced diameter shaft 21a extending from one end of the worm body in axial alignment with the worm, and this shaft 21a is journaled in and extends outwardly through bore 16a of the bushing 16 with the worm 21 positioned at the inner end thereof in operative mesh with the teeth 20t of worm wheel 20. Shaft 21a extends outwardly into the pocket or recess 15 in the dial member and a knurled operating knob 17 is threaded on to the shaft end in position in pocket 15 readily accessible to the operator for manual rotation.

The worm or dial cam, referring now to Figs. 5 and 6, comprises an interrupted thread 22 therearound which is developed from a single thread, helical screw, the development of which is schematically illustrated by Fig. 5. The thread 22 is interrupted by and formed to provide on the worm or cam, a slot 23 extending through the threads and disposed longitudinally of the worm or cam at one side thereof, this slot being formed by aligned gaps or breaks in the convolutions of the thread 22. Thus, by rotating worm 21 to position with the clearance slot 23 thereof aligned with and receiving therein the teeth 20t of the worm wheel 20, worm 21 and worm wheel 20 are in disengaged relation and the dial member 10 may be freely rotated by the operator in either direction on and around feed screw C. The worm will be re-engaged with worm wheel 20 to reestablish operative engagement through the irreversible driving connection formed thereby, upon rotation of the worm by knob 17 either to the right or to the left. In order to eliminate the effect of the clearance slot 23, we form the interrupted thread 22 of worm or cam 21, so that, the lead of the worm is in excess of the normal pitch of the worm wheel 20, as indicated on Fig. 5. By this arrangement, no dead spots will occur in the adjustment range. In other words, the pitch of the threads equals the circular pitch of the worm wheel 20, but the lead of the thread which normally is equal to the pitch on a single thread screw, is actually in excess of this pitch. Because of such design and arrangement in the production of the worm or cam 21, the interrupted convolutions of the thread 22 are machined separately as they do not form a continuous helix.

A detent arrangement is provided, referring now to Fig. 3 in particular, for releasably holding knob 17 and the worm 21 in position with the clearance slot 23 of the worm aligned with and receiving worm wheel 20 to thus disengage the dial member 10 from feed screw C, so that, the dial may be freely rotated on and relative to the screw. Such detent arrangement in the form of Fig. 3, may comprise a detent pin 25 which is slidably mounted in and extending through the web or wall portion 15a of dial member 10 in position with the forward end 25a thereof projected outwardly beyond the outer side of wall 15a at the inner side of knob 17. This detent pin 25 has the forwardly projected end 25a thereof pointed or of conical form. The inner length 25b of detent pin 25 is of reduced external diameter to provide an intermediate shoulder 25c around the pin. A coil expansion spring 26 is mounted on the reduced diameter length 25b of the pin under compression between the pin shoulder 25c and fixed structure of the dial member 10. Detent pin 25 is thus continuously biased outwardly but may be forced inwardly of the dial member against the forces of the spring 26.

A pair of conical headed stop pins 27 are mounted in fixed position in knob 17 extending inwardly from the inner side thereof. Stop pins 27 are so located on the knob 17 relative to worm 21 and the clearance slot 23 thereof, that when the knob is rotated to position with the clearance slot 23 of the worm aligned with worm wheel 20, the spring loaded detent pin 25 has the outwardly projected end 25a thereof received and fitting into the space between the outwardly projected heads of the stop pins, as clearly shown more or less diagrammatically by Fig. 3. Rotation of the knob 17 by the operator to either the right or the left will cause the conical head of that one of the pins 27 which is turned toward the conical projected end of detent pin 25a, to cam or force the latter pin inwardly until the engaging pin 27 has been rotated past and is clear of detent pin 25. Such rotation of knob 17 will rotate worm 21 to engage the interrupted thread 22 thereof with the worm wheel and thus permit the fine precise adjustment of dial member 10 on and relative to the feed screw C. It is to be here noted that the foregoing detent arrangement not only functions to enable the operator to align the clearance slot 23 of worm 21 with the worm wheel, but also functions to limit the degree of rotation of the worm wheel, so the operator cannot accidentally adjust the worm 21 with only a part of the interrupted thread 22 thereof engaged.

If desired or found expedient, the location of the stop pins 27 and the detent pin 25, may be reversed as shown in Fig. 4, with the detent pin 25 mounted on knob 17, and the stop pins 27 mounted on the dial member 10 in position for receiving therebetween the detent pin when the knob is rotated to a position in which the worm clearance slot 23 is aligned with the worm wheel 20.

With the form of micrometer dial and adjusting mechanism of Figs. 1 to 9, when the worm or cam 21 is in operative mesh with the worm wheel 20 on the feed screw C, the dial member is locked to the feed screw against rotation on and relative to the screw, due to the irreversible character of the connection formed by the engaged worm and worm wheel. The worm 21 may be rotated in either direction and to any degree in the range provided by the interrupted thread 22 of the cam between the clearance slot 23, to thus cause rotation of the dial member 10 on feed screw C. In this manner, the dial is adjustable to infinite positions of adjustment throughout the adjustment range. Hence, very fine, precise adjustments of the dial member 10 on the feed screw C can be practically effected to bring the dial member to a desired position of adjustment, as determined by reading the scale S against the index line or marker L.

In making an adjustment of the dial, the operator may make the initial coarse, approximate adjustment by first rotating knob 17 until detent pin 25 snaps into engagement between stop pins 27. In this position of the worm 21, the clearance slot 23 is aligned with and receives worm wheel 20, so that, the worm and worm wheel are disengaged and the operator may by grasping the dial member 10, then freely rotate that member in either direction to the approximate position of final adjustment as indicated by the scale S against the index line L. The operator then rotates knob 17 in the required direction and engages worm 21 with the worm wheel, so that, by continued rotation of knob 17 and the worm 21, the dial member 10 may be rotated to the final precise position of adjustment as determined by the exact lining up of the proper scale division s of scale S with the index line L. When this adjustment is completed, it is unnecessary for the operator to perform any additional locking operations, as the engaged worm 21 and worm wheel 20 will lock the dial member in adjusted position on feed screw C and maintain it in precisely adjusted position against inadvertent displacement under any of the displacing forces to which the dial will be subjected in normal operation of the feed screw C.

It is thus possible to utilize a dial member 10 of relatively large diameter to obtain a large size readily visible scale S, even for a dial on a power driven feed screw C which may be rotated at a relatively high rate of speed. The high inertia forces developed by the large diameter dial will be successfully resisted and overcome by the engaged worm 21 and worm wheel 20, and the dial will not be displaced by such forces from its precise position of adjustment. The dial and its adjusting mechanism of our invention eliminates the high error potential inherent in dial arrangements as heretofore utilized, which require not only an adjusting operation but also require a final locking operation by a separate locking means.

It is to be noted that in the example embodiments of our invention as disclosed and described herein, the adjusting mechanism is located within the confines of and substantially enclosed within the cup-like dial member or body, so that, not only is the adjusting mechanism protected from injury by contact with exterior objects, but the scale bearing, exterior peripheral surface of the side wall forming flange 12 is completely unobstructed by the adjusting mechanism to maintain maximum visibility for the scale S. Similarly, the recessing of the wall 12 of the dial member to provide the recess 15 opening through the base wall 10, permits of locating the operating knob for the adjusting mechanism in those forms utilizing such a knob, with a negligible projection outside of the basic contour of the dial member, thus, providing a minimum of projecting structure with a minimum of visual obstruction to the scale S of the dial member.

What we claim is:

1. In combination, a rotary element, a micrometer dial mounted thereon for rotation independently thereof, a worm wheel fixed on said rotary element, a worm mounted on and carried by said dial and including threading for meshing engagement with said worm wheel, and said worm and threading being formed to provide a slot disposed longitudinally of the worm through said threading for rotation by said worm to a position aligned with said worm wheel with the threading of the worm disengaged from said worm wheel.

2. In combination, a rotary element, a micrometer dial mounted thereon concentric therewith for rotation independently thereof, a worm wheel mounted in fixed position on said rotary element, a worm mounted on and carried by said dial in position disposed tangentially of said worm wheel, said worm including threading and being formed to provide a slot disposed longitudinally of the worm through and interrupting said threading, said worm being mounted for rotation with the threading thereof in meshing engagement with said worm wheel to rotate said dial to positions of adjustment on said rotary element, and said worm being rotatable to position said slot in alignment with the adjacent portion of said worm wheel to release the dial for rotation on and independently of said rotary element and said worm wheel.

3. In combination, a rotary element, a micrometer dial mounted thereon for rotation independently thereof, a worm wheel mounted in fixed position on said rotary element, a worm rotatably mounted on and carried by said dial in meshing engagement with said worm wheel, and said worm being formed to provide a longitudinally disposed slot in one side thereof for rotation by said worm to position aligned with the worm wheel to disengage the worm from said wheel and release the dial for rotation on and independently of the rotary element and said worm wheel thereon.

4. In combination, a rotary element, a micrometer dial mounted thereon for rotation independently thereof, a worm wheel mounted in fixed position on said rotary element, a worm rotatably mounted on and carried by said dial in meshing engagement with said worm wheel, said worm being formed to provide a longitudinally disposed slot in one side thereof for rotation by said worm to position aligned with the worm wheel to disengage the worm from said wheel, and detent means for releasably holding said worm in disengaged position with the slot thereof aligned with said worm wheel.

5. In combination, a rotary element, a micrometer dial mounted thereon for rotation independently thereof, a worm wheel mounted in fixed position on said rotary element, a worm rotatably mounted on and carried by said dial in meshing engagement with said worm wheel, said worm being formed to provide a longitudinally disposed slot in one side thereof for movement by rotation of said worm to a position aligned with the worm wheel to disengage the worm from said wheel, means for rotating said worm including an operating knob positioned on said dial, and detent means for releasably engaging said knob and dial to maintain the knob in position with the worm slot aligned with said worm wheel.

6. In combination, a rotary element, a micrometer dial mounted thereon for rotation independently thereof, a worm wheel fixed on said rotary element, a worm rotatably mounted on and carried by said dial, said worm including threading for meshing engagement with said worm wheel, said worm and threading being formed to provide a slot disposed longitudinally of the worm through and interrupting said threading for rotation by said worm to a position aligned with said worm wheel to disengage the worm threading from said wheel, and said interrupted worm threading being formed to have a lead in excess of the normal pitch of the worm wheel.

7. In combination, a rotary element, a micrometer dial mounted thereon for rotation independently thereof, a worm wheel fixed on said rotary element, a worm rotatably mounted on and carried by said dial, said worm having a single thread therearound and being formed to provide a slot disposed longitudinally of the worm through and interrupting said thread for rotation by said worm to a position aligned with and disengaged from said worm wheel, and said single, interrupted thread being formed to have a lead in excess of the normal pitch of the worm wheel.

THEODORE F. ESERKALN.
FREDDY STEINBRECKER.
OTTO HAROLD ARNDT.

REFERENCES CITED

The following references are of record in the file of this patent:

UNITED STATES PATENTS

| Number | Name | Date |
|---|---|---|
| 939,903 | Gilbert | Nov. 9, 1909 |
| 1,660,365 | Verwys | Feb. 28, 1928 |
| 1,772,372 | Tierney | Aug. 5, 1930 |
| 2,038,728 | Gilbertson | Apr. 28, 1936 |
| 2,273,956 | Hall | Feb. 24, 1942 |
| 2,310,623 | Estey | Feb. 9, 1943 |
| 2,348,391 | Kester | May 9, 1944 |